Feb. 17, 1959

H. TAILLEFERRE 2,873,761

FLOW CONTROL APPARATUS

Filed July 25, 1956

INVENTOR.
HENRI TAILLEFERRE

BY  Bauer and Seymour
ATTORNEYS

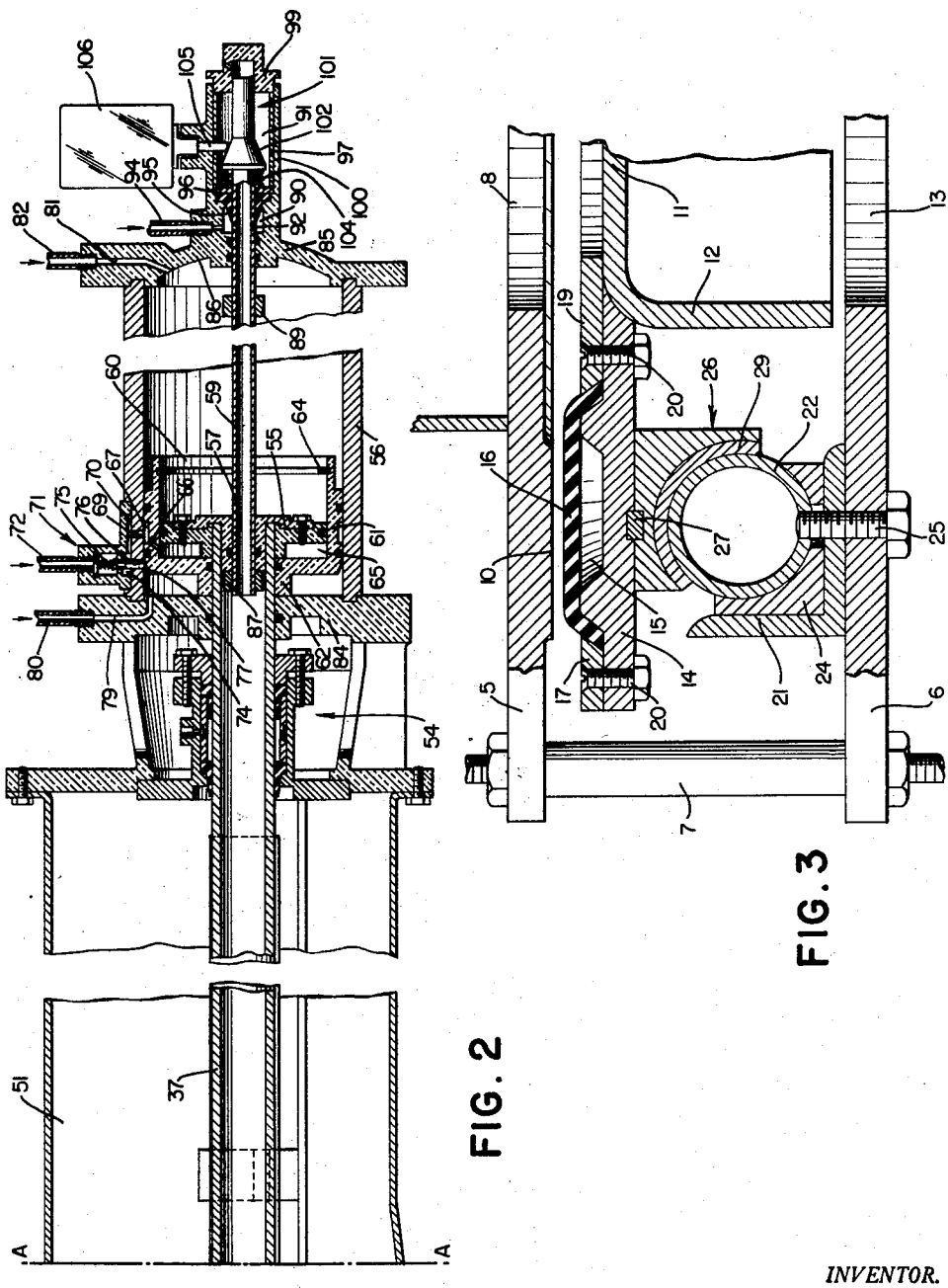

Feb. 17, 1959

H. TAILLEFERRE 2,873,761

FLOW CONTROL APPARATUS

Filed July 25, 1956

INVENTOR.
HENRI TAILLEFERRE

BY Bauer and Seymour
ATTORNEYS

INVENTOR.
HENRI TAILLEFERRE

United States Patent Office 2,873,761
Patented Feb. 17, 1959

2,873,761

FLOW CONTROL APPARATUS

Henri Tailleferre, Paris, France, assignor to Societe Anonyme des Manufactures des Glaces et Produits Chimiques de Saint-Gobain, Chauny & Cirey, Paris, France Application July 25, 1956, Serial No. 600,090

Claims priority, application France July 26, 1955

30 Claims. (Cl. 137—553)

This invention relates to flow control apparatus and more particularly to valve structures having a sliding gate and provided with elastic sealing elements which are actuated to seal the valves after the gate has been suitably positioned. The valve of the invention is adapted for regulating and controlling the flow of fluides or the like through conduits or other passages, and is provided with control means for positioning the gate and actuating the sealing means, thereby to seal the passage.

One of the objects of the present invention is to provide novel improved control mechanism for the valve, such control mechanism being particularly adapted for location remote from the valve.

Another object of the invention is to provide control mechanism for a valve of the type indicated wherein the parts interact in a novel manner to provide a safety interlock, so that the apparatus provides absolute safety of operation.

Still another object of the invention is to provide operating mechanism for a gate valve having selectively deformable sealing means wherein the mechanism is controlled by one lever by which the valve may be opened and closed.

A further object is to provide, in the combination of a gate valve having deformable sealing means and control mechanism therefor, an auxiliary valve positioned on the main gate of the valve and selectively operated by the valve controlling mechanism.

Still another object is to provide, in the combination indicated immediately above, mechanism for operating the main valve and the auxiliary valve by mechanism including a common fluid conducting part, the auxiliary valve being capable of control independently of the main valve.

Another object is the provision, in the combination of a main gate valve, an auxiliary valve seated thereon, and mechanism for independently controlling the main and auxiliary valves, of an interlocking control whereby the auxiliary valve can be closed only when the main gate valve is in closed position.

A still further object is the provision of valve control mechanism wherein the common fluid conducting part of the mechanism controlling the main and auxiliary valves is subjected to fluid pressure only during the phase of operation including the final closing of the main gate of the valve and the maintenance of such gate in closed position.

Another object is to provide, in valve controlling mechanism of the type above indicated, means employing one compressed fluid for positioning the main gate in sealing location or removing it therefrom, and another compressed fluid for expanding the resilient sealing means on the gate.

The above and further objects and novel features of the invention will more fully appear from the following detail description when the same is read in connection with the accompanying drawings. It is to be expressly understood, however, that the drawings are for the purpose of illustration only and are not intended as a definition of the limits of the invention.

In the drawings, wherein like reference characters refer to like parts throughout the several views, Fig. 1 is a fragmentary axial cross section of one form of valve assembly embodying the invention, such valve including a main gate and an auxiliary valve positioned on the gate;

Fig. 2 is a fragmentary view in axial cross section of control means for the valve of Fig. 1;

Figs. 1 and 2 when placed in alignment with lines A—A of each together, show the combination of a valve and an actuating mechanism therefor;

Fig. 3 is a fragmentary view in vertical section showing a portion of the valve gate and a horizontal guide upon which the gate slides;

Figure 5:
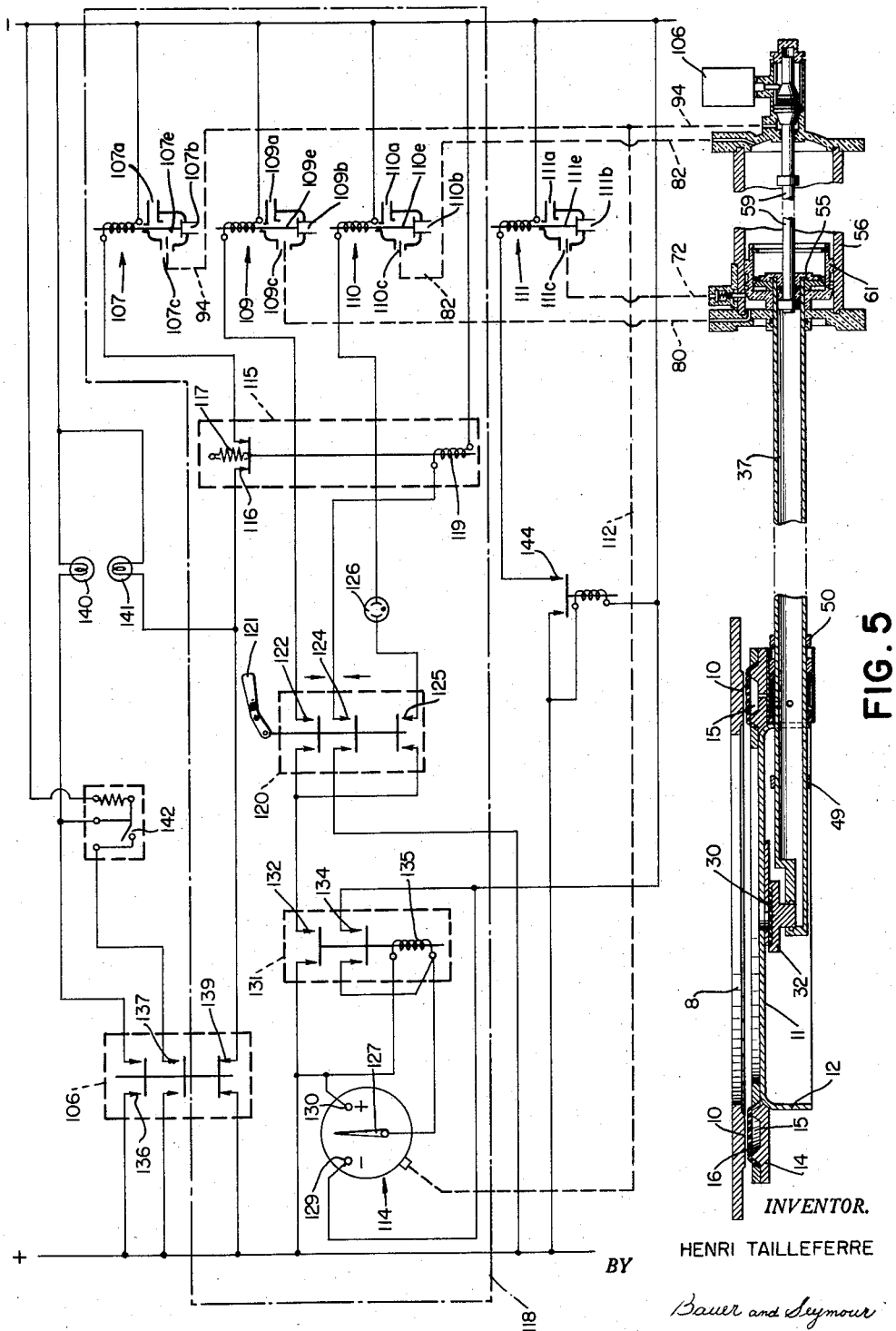
Fig. 5 is a fragmentary view of the valve and its actuating mechanism with a diagram of the circuits, valves, and other elements controlling said mechanism.
Figure 6:
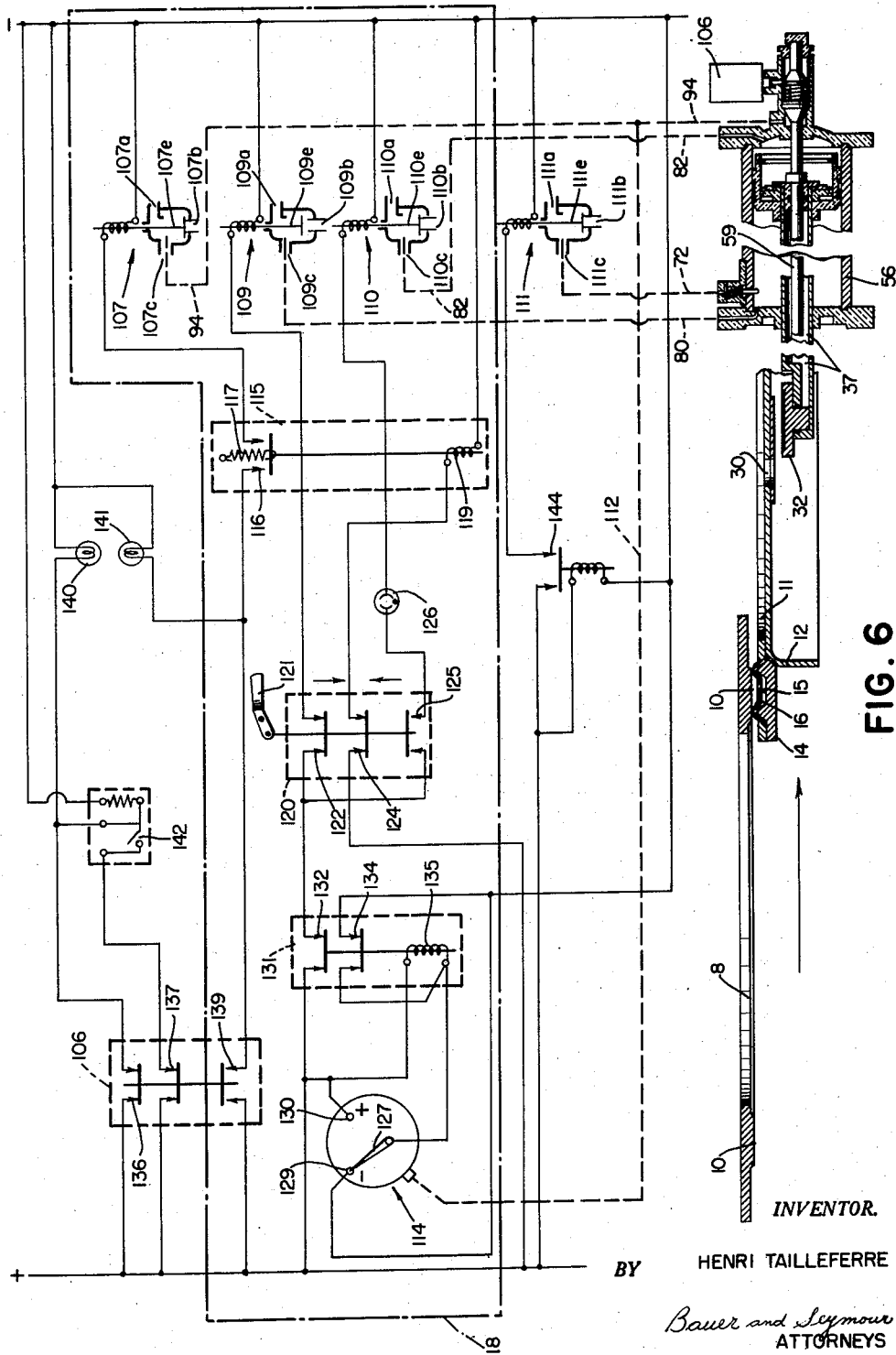

In Fig. 5, the gate of the valve is shown in passage-sealing location, but with the resilient sealing means on the gate in relaxed condition;

Fig. 6 is a view similar to Fig. 5, but with the gate of the valve retracted into passage-opening position, and the resilient sealing means placed under vacuum to retract it from the valve seat.

A single embodiment of the invention is illustrated in the accompanying drawings, by way of example, in the form of a valve mechanism or gate and control means therefor, which mechanism and means are adapted for controlling flow of a medium, such as liquid or gases, to or from a vessel or through a valve casing. As shown, a dual type valve assembly comprising both a main and an auxiliary valve in novel combination is constructed and mounted to control flow through a throat 2 in the top of a chamber or tank 4 adapted to receive substances to be submitted to chemical reactions or the like. Although a dual valve construction is illustrated, it will be clear from the description which follows that novel features of the operating and control mechanisms are useful in conjunction with the main valve alone when an auxiliary or secondary valve is not required.

In the form shown, the main valve is mounted for sliding reciprocating movement between two plates 5 and 6 supported in spaced parallel relation by a plurality of posts 7 arranged in an enlarged annular portion of tank 4. The upper and lower plates have central openings 8 and 13, respectively, which are preferably in substantial alignment with tank opening 2. Upper plate 5 engages and may be secured as by welding to the inner edge of a ring or collar 9 which surrounds opening 2 and serves as a pilot for a container or the like from which materials may be fed into tank 4.

An annular portion 10 of top plate 5 constitutes a valve seat for the main valve which, in the form shown, comprises a body portion 11 with a strengthening flange 12. Secured to and extending radially from valve body 11, 12 is an annular peripheral flange 14, the upper surface of which has two radially spaced ribs forming a channel 15 in the upper surface thereof. A flexible annular membrane or diaphragm 16 of resilient, plastic or other suitable material is secured across channel 15 in a gas-tight manner, such as by means of rings 17, 19 and bolts 20 (Fig. 3). Channel 15 is thus converted to an expansible fluid-tight chamber.

The main valve described above is supported for reciprocating movement by lower plate 6 in a position which will permit diaphragm 16 to expand into sealing engagement with valve seat 10 when chamber 4 is pressurized.

Parallel rails for slidably supporting the valve structure may be of any suitable type and in the form shown, each rail comprises an angle bar 21 and a hollow rod or tube 22 supported in the bar by blocks 24 (Fig. 3). Any suitable means, such as stud bolts 25, may be employed for securing the parts of the rail together and to plate 6. Operably connected to the lower face of flange 14 on the main valve are runners 26 shaped to engage the curved surface of rail rod 22. The runners are preferably connected to flange 14 by means of thimbles 27 which permit a certain freedom of orientation, and the bearing surface thereof is preferably lined with a bearing metal 29 to reduce friction during sliding movement of the valve.

If desired, but without necessity and for a purpose to hereinafter appear, the body 11, 12 of the main valve may be provided with an opening 30 through which flow may be controlled by an auxiliary valve novelly combined with the main valve. In the illustrated embodiment, the auxiliary valve comprises a vertically movable piston 31, the upper end 32 of which is flanged and is adapted for sealing engagement with valve body 34 around opening 30. If desired, the upper surface of flange 32 may have a suitable packing 35 of rubber or the like to insure a tight seal. Piston 31 has a fluid-tight sliding fit in cylinder 36 that is supported by and has internal communication with a hollow tube or pipe 37. In the event the auxiliary valve is not required, pipe 37 may be closed off at its end and opening 30 in the main valve body may be dispensed with. It will be seen that when the parts are in the position illustrated, a fluid pressure within pipe 37 will urge parts 31, 32 of the auxiliary valve to closed position, whereas in the absence of pressure the auxiliary valve will be pulled downwardly as viewed in the drawings to open position by gravity, or by vacuum, if the latter is provided.

Figure 1:
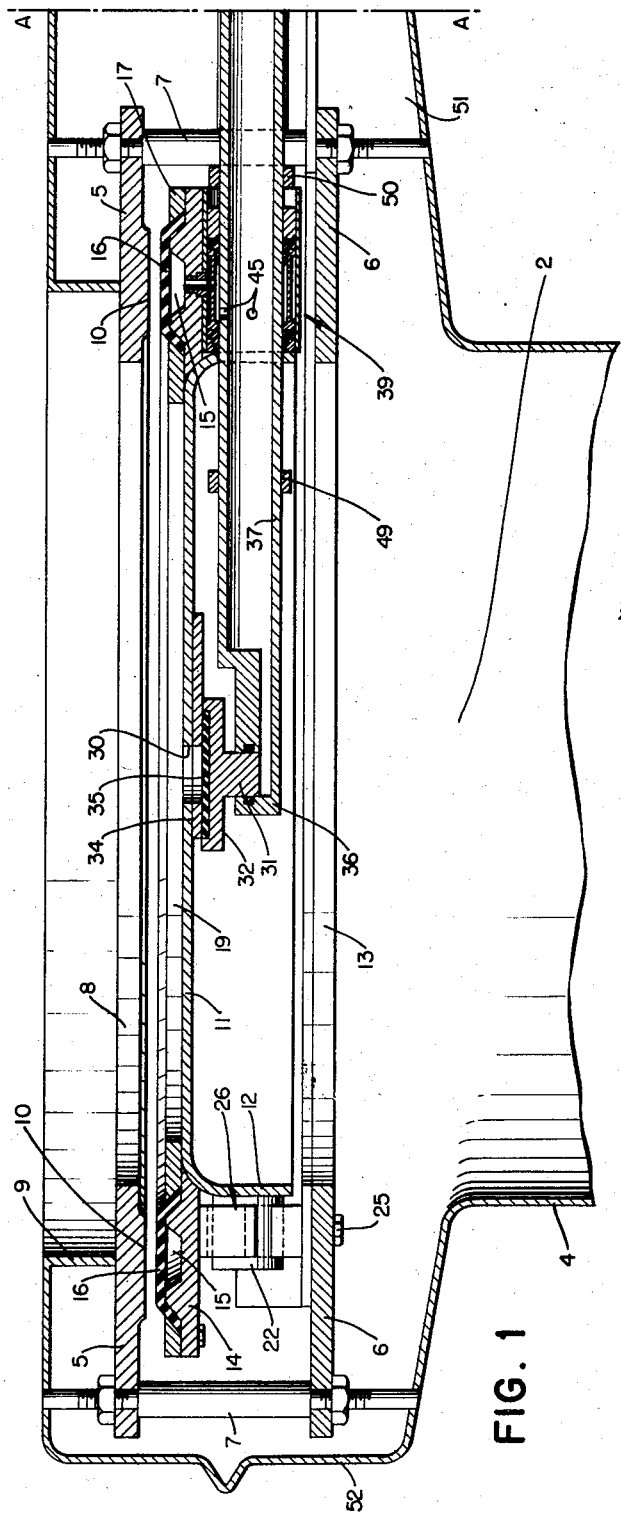
Figure 4:
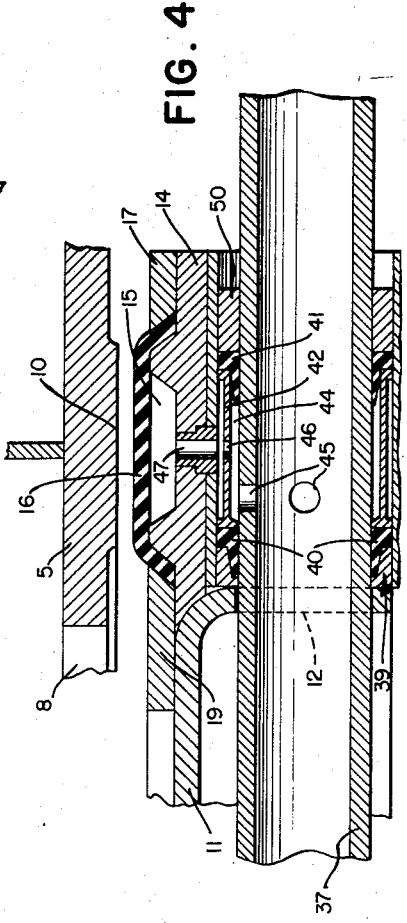
Fig. 4 is a fragmentary view in axial section of a portion of the gate at the location of the sealing box through which the gate actuating tube reciprocates.

In addition to serving as a fluid conduit, the pipe or tube 37 also functions mechanically as a rod for imparting reciprocating movement to the main valve (and to the auxiliary valve when one is provided). For this purpose and for the purpose of supplying fluid to channel 15, tube 37 slidably extends through a hollow box or casing 39 which is secured to and depends from valve flange 14 at the right in Figs. 1 and 4. Within the box, the tube has a fluid-tight sliding fit in gaskets 40, 41 which are held in spaced relation by a sleeve 42 forming an annular chamber 44 around tube 37. The interior of the tube communicates with chamber 44 through radial ports 45 and said chamber communicates with expansible channel 15 in the main valve through ports 46 and 47 in sleeve 42 and flange 14, respectively. For a purpose to appear hereafter, a lost motion connection is provided between tube 37 and box 39 and hence, main valve 11, 12. This is accomplished by securing spaced lugs or stops 49 and 50 on said tube which engage opposite ends of said box 39 when the tube is reciprocated, the spacing of the stops being a predetermined amount greater than the length of the box. Tube 37 extends radially outward through a lateral extension 51 of casing 52 at the upper end of chamber 4 and in a fluid-tight manner through a suitable supporting or bearing box 54 (Fig. 2) secured to said casing.

Novel means for actuating and controlling the reciprocating movement of tube 37 and hence, the movements of either or both of valves 11, 12 and 32 are provided by the present invention, and in the form shown, said means includes electrically controlled pneumatic power means. Said power means comprises an auxiliary or secondary piston 55 formed integrally with or, as shown, secured to the free outer end of tube 37 which extends in a fluid-tight manner into a power cylinder 56 through a stuffing box in one end thereof. Auxiliary piston 55 has a central axial passage 57 therethrough into which extends a tube 59 communicating with the interior of tube 37. Piston 55 is mounted for limited reciprocating movement in a cylindrical recess 60 formed in a main or primary piston 61. The latter has a sliding fit in cylinder 56 and the hub portion 62 thereof has fluid-tight sliding engagement around tube 37. A suitable stop, such as a ring 64 in cylindrical recess 60 of piston 61 is provided for limiting the movements of auxiliary piston 55 relative to main piston 61. It will thus be seen that movement of auxiliary piston 55 toward the right, as viewed in the drawings, will impart movement through tube 37 to auxiliary valve 31, 32 for opening the same. When stop 49 engages box 39, continued movement of piston 55 and tube 37 toward the right will move main valve 11, 12 out of registration with the annular seat 10 about the main valve passage.

For the purpose of connecting the annular space 65 at the left of piston 55 in recess 60 with a source of fluid pressure, such as compressed air, a radial port 66 in main piston 61 connects said space with an annular groove 67 in the surface of piston 61. Said groove communicates through radial port 69 with a chamber 70 formed by an adaptor 71 attached to cylinder 56, which chamber in turn communicates with a conduit 72 through a valve 74 which is urged toward closed position by suitable resilient means 75. The position of said valve is controlled by piston 76, and to this end, the same has a stem which extends through the walls of cylinder 56 for engagement by the chamfered or cammed surface 77 of piston 61. The space within cylinder 56 to the left of piston 61 is adapted to be connected to a source of fluid pressure through a passage 79 and a conduit 80. A port 81 and conduit 82 are also provided for connecting the other or right-hand end of cylinder 56 to a source of fluid pressure for acting on both pistons 55 and 61. The movement of piston 61 toward the left (Fig. 2) is limited by end wall 84, and similar movement of piston 55 is limited by abutment with piston 61.

For connecting the interior of tube 37 to a source of fluid pressure or vacuum, the above-mentioned tube 59 is employed. Tube 59 is open at its left end and closed at its right end, and has a fluid-tight sliding fit adjacent its open end in said passage 57 of piston 55. Tube 59 has a similar fit adjacent its closed end through a stuffing box 85 in the right-hand end wall 86 of cylinder 56. Movement of tube 59 toward the right relative to piston 55 is limited by a collar or stop 87 secured to the tube. Movement of tube 59 toward the right is in any event limited by a collar or stop 89 secured thereto and adapted to abut the end wall 86. Beyond the latter wall the mobile tube 57 extends through a closed chamber 90 and thence into a chamber or cage 91. That portion of the tube 59 in chamber 90 is provided with radial ports 92 which connect the interior of said tube with said chamber, and the latter may be alternately connected through conduit 94 with suitable sources of fluid pressure and vacuum. A gasket or packing ring 95 held in position in any suitable manner, such as by a plate 96, sleeve 97 and a plug 99, in extension 100 of end wall 86 is adapted to seal chamber 90 at its outer end and to close ports 92 for interrupting communication between said chamber and tube 59 when the latter is moved sufficiently toward the right. As will be more clearly apparent hereinafter, tube 59 remains in the position shown in Fig. 2, and thus ports 92 remain open, until piston 55 has moved to the right, in opening the main valve member, sufficiently to engage stop collar 89 on tube 59 and thereafter to move tube 59 somewhat to the right.

Within cage 91, tube 59 has a preferably solid extension 101 on which is formed an external conically tapered flange 102. A spring 104 interposed between said flange and plate 96 is under compression and tends to move tube 59 toward the right to the extent that it is permitted by the other parts of the structure to be so moved. The conical or cam surface of flange 102 engages the inner end of a stem or push rod 105 of an electrical switch 106 to be hereinafter more fully described.

The control circuit shown in Figs. 5 and 6 for the operating mechanism of the valve will be understood by first considering briefly the main elements thereof which control the positioning and sealing of the main gate of the valve. The control circuit includes an electromagnetically operated valve 107 which controls the admission of fluid under pressure or the admission of a vacuum to the channel 15 on the gate. Electromagnetically operated valve 109 controls the admission of a fluid under pressure to the main cylinder 56 of the valve operating mechanism to move the valve gate into passage-opening position. Electromagnetically operated valve 110 controls the admission of a fluid under pressure to the right-hand end of cylinder 56 to move the valve gate into passage-closing position. A pressure and vacuum responsive manometer 114 is connected to the annular cavity 15; the needle 127 of the manometer engages a contact 129 thereof when cavity 15 is under vacuum and engages contact 130 when the cavity is under pressure. The control circuit includes a hand operated switch 120 which has a handle 121 to move the contactor thereof in a vertical direction. When the contactor is depressed, the valve controlling mechanism is energized to place the valve gate in passage-closing position, and when the contactor of switch 120 is raised, the mechanism is energized to retract the valve gate to open position.

The switch 106 constitutes a means whereby movement of the gate into its fully retracted position may be detected and employed to energize interlocking controls. Thus, the circuit energizing valve 107 is closed only when the gate of the valve is in fully closed position. The circuit also includes a relay 131 responsive to the position of the needle of manometer 114, and a relay 115 responsive to the position of the manually operated switch 120.

Having thus briefly described the main elements of the control circuit and their manner of interaction, the apparatus will be more fully understood by consideration of an operating cycle of the mechanism as illustrated in Figs. 5 and 6.

The complete system comprises four electromagnetic valves 107, 109, 110, 111, each having three ports 107a, 107b, 107c, 109a, 109b, 109c, 111a, 111b and 111c, respectively, as well as movable valve element 107e, 109e, 110e and 111e, respectively.

The port 107a is connected with a source of vacuum (not shown), whereas the ports 109a, 110a and 111a communicate with the atmosphere.

The ports 107b, 109b and 111b are connected with a source (not shown) which furnishes a fluid, such as air, under pressure. The port 107c is connected to the pipe 94 which is connected to chamber 95. Pipe 94 is also connected by a pipe 112 with the manometer 114.

The electromagnetic valve 107 is controlled by a relay 115 in which the contact 116 is held closed by a spring 117 except during the time that its opposed coil 119 is energized.

The operation of the interlocking means of the valve operating mechanism is effected by means of the switch 120 by lever 121. Switch 120 has three contacts 122, 124 and 125, the movable contactor of switch 120 being lowered to close the gate of the valve and raised to open the gate.

The contact 122 of the switch 120 controls the valve 109; the contact 124 controls the coil 119 of the relay 115, and the contact 125 controls the electrolytic valve 110 by means of an operating device with a photo-electric cell 126 or any other means of control.

The contact manometer 114 cooperates with relay 131, which has two sets of contacts 132 and 134 as well as an energizing coil 135.

The signalling contactor and control 106 has three contacts 136, 137 and 139. In the position of the apparatus shown in Fig. 5, contacts 136 and 137 are open and contacts 139 are closed. When the parts of the apparatus are in the position shown in Fig. 6, however, the movable contactor of means 106 will have shifted to close contacts 136 and 137 and to open contacts 139. The contacts 136 and 139 close signalling circuits comprising the signalling lamps 140 and 141, respectively. The contact 137 energizes an interruptor 142 producing an intermittent signal in the lamp 140 as long as the lock has not reached either its closed or its open position but is in the process of displacement. The valve 111 is controlled by a manometric contactor 144 which reacts to the pressure in the reaction chamber 4.

Fig. 5 shows the gate of the valve in its closed position, but the control mechanism is neither fed with electric current nor connected with the vacuum and pressure source. In this case, the electromagnetic valves 107, 109, 110 and 111 occupy the position shown, i. e., their movable valve elements 107e, 109e, 110e and 111e close the pressure-inlet ports 107b, 109b, 110b, and 111b, respectively. The needle 127 of the manometer 114 occupies the central, neutral position, as shown. Starting from the assumption that the lock was not completely closed, the position indicator 106 is in an intermediate position in which the contacts 136 and 139 are open but the slidable contact 137 is closed to energize the interruptor 142.

To start the installation, the vacuum and pressure sources are put in service and the two positive and negative poles of the apparatus are energized. Given the fact that the electrolytic valve 107 establishes a communication between the vacuum admission tube 107a and the tube 94, a vacuum is created, through the pipes 94 and 112 in the manometer 114, on one hand, and, the ports 92 being exposed, through the pipe 94, the tube 59, the tube 37, the holes 45 and 46 and the passageways 47 in the channel 15 and in the chamber 36, on the other hand, which provokes suction on the diaphragm 16 so as to pull it from its seating, on one hand, and the return of the piston 31, on the other hand, so that the latter no longer exerts pressure on the auxiliary valve seat 34.

The vacuum in the manometer 114 brings the needle 127 back into the position in which it makes contact with the contact 129 (Fig. 6). The establishment of this contact assures that feeding of the coil 135 of the relay 131 which closes the contacts 132 and 134, at the same time restoring the circuits of the switch 120, which has been interrupted by the above described operations.

To bring the gate to its closed position, the movable contactor of the switch 120 is displaced downwardly. This movement causes the contact 125 to close, thus establishing the control circuit of the valve 110, provided that the safety device with the photo-electric cell 126 does not reveal the presence of any foreign matter in the path of the gate, such as the chain of a crane, etc.

The excitation of the electromagnetic valve 110 brings the valve element 110e in a position cutting tube 82 off from the atmosphere but connected with the tube 110b for the admission of fluid under pressure. This fluid, through pipe 82, reaches the cylinder 56. The pressure thus established in the cylinder 56 pushes the main piston 61 and the auxiliary piston 55 in the direction corresponding to the closing of the gate, the auxiliary valve being actuated directly by the operating tube 37 and the main gate by the stop collar 50 acting on the watertight box 39 which is connected with the flange 14 of the main gate.

At the end of the travel of the auxiliary piston 55, the movable tube 59 is brought—through the contact made by its stop 87 with the boss on the auxiliary piston 55—in a position in which the cam 102 displaces the signalling contactor 106 in such a way that the contact 139 is closed. The closing of this contact establishes, by means of the closed contact 116 of the relay 115, the energizing circuit of the valve 107. The valve element 107e then occupies a position in which it interrupts the communication between the tube 107c and the source of vacuum and places the tube 94 in communication with the port 107b, thus assuring the admission of the control fluid under pressure. The control fluid then gets access, through the pipes 82, 94 and 112, respectively, to chamber 90, on the one hand, and to the contact manometer 114, on the other. The pressure coming through the chamber 90 into the tubes 59 and 37 thrusts, by means of the piston 31, the auxiliary valve 32 on its seating and causes the inflation of the diaphragm 16, which thus is also held against its seating. The lock is then hermetically closed.

On the other hand, the pressure brings the needle 127 of the manometer 114 into engagement with the contact 130. In this position the coil 135 of the relay 131 is shunted, i. e., is no longer energized, thus opening the contact 132 and therefore excluding the valve 109, which controls the opening of the gate, from the circuit. Therefore, as long as the diaphragm 16 and the auxiliary valve 32 are held to their seating by pressure, neither the main gate nor the auxiliary valve can be displaced. The closing of the contact 139 of the signalling contactor 106 causes the permanent lighting of the signallying lamp 141, indicating that the gate is in its closed position.

In order to open the gate, the contactor of switch 120 is raised. This movement causes the closing of contacts 122 and 124 and the interruption of contact 125. The closing of the contact 124 causes the relay 115 to be energized and thus causes the opening of its contact 116. The opening of this contact cuts off the valve 107 so that its movable element 107e cuts off communication between the pressure port 107b and the port 107c, thus to connect the tube 94 with the source of vacuum. Tube 37 and the manometer 114 are thus subjected to vacuum. This causes, on one hand, the withdrawing of the piston 31 which holds the auxiliary valve 32 on its seat, and the drawing back of the diaphragm 16. On the other hand, the needle 127 of the manometer 114 returns to its vacuum position, engaging contact 129 (Fig. 6). Only when the needle 127 has reached this position, i. e., when the diaphragm 16 is under negative pressure, can the retraction of the gate be carried out.

Contact of the needle 127 with the stud energizes the coil 135, thus re-establishing the contacts 132 and 134. This puts back in the circuit the electromagnetic valve 109 through the contact 122 of the control switch 120. The movable element 109e of valve 109 then occupies a position in which the port 109c is connected with the pressure inlet port 109b. This pressure travels through the pipe 80 so as to push back the main piston 61. In its movement piston 61 takes along auxiliary piston 55.

The displacement of the auxiliary piston 55, and of the operating tube 37 which is part of it, causes first of all the displacement of the auxiliary valve 32 and, after a certain amount of travel of the latter, the displacement of the main gate 11, 12, assuming that the stop 49 rests against the bottom edge of the main gate.

When the locking is completely open, the cam 102 brings the signalling contactor 106 to a position where its contact 136 is closed, thus causing the permanent lighting of the signalling lamp 140, to indicate that the gate is open. The lamp 141, which indicates the closed position of the gate, is now extinguished, because the contact 139 is open.

The above arrangement prevents any faulty manipulation of the valve and its operating mechanism. The gate cannot be moved as long as the piston 31 of the auxiliary valve 32 and the diaphragm 16 are not subjected to vacuum. Further, piston 31 and diaphragm 16 cannot be submitted to operating pressure as long as the main gate of the valve has not reached its closed position.

The auxiliary valve 32 not only forms a by-pass to facilitate the opening of the main gate, but also constitutes a discharge valve or regulating valve as will be described hereafter:

When an over-pressure in the treating tank 4 causes the manometric contact 144 to close, the valve 111 receives current and its movable element 111e will be raised so that the port 111c is connected with the pressure inlet port 111b so that this pressure is admitted to pipe 72.

When the gate is closed, i. e., when the main piston 61 is at the left-hand end of its stroke, the chamfer 77 on the end of piston 61 has pushed back the stem 76 of the valve 74 in order to remove it from its seating, and, consequently, fluid under pressure passes through the open valve 74 into the chamber 65 at the left of the auxiliary piston 55. The auxiliary piston 55 is then pushed back and in its movement takes along the operating tube 37 and, therefore, the auxiliary valve 32. The opening of the port 30 then permits excess pressure in the chamber 4 to be discharged. The stroke of the auxiliary piston 55 in the direction corresponding to the opening movement of the auxiliary valve is limited by the ring 64 in main piston 61.

When the excess pressure in the tank 4 has been relieved, the manometric contact 144 opens, which puts out of the circuit the electromagnetic valve 111, whose movable element 111e then again occupies the lower position, in which the pipe 72 is connected with the atmosphere. Subsequently, the pressure in the chamber 65 disappears, permitting the pressure in the main cylinder 56 to again push back the auxiliary piston 55 in the direction corresponding to the closing movement of the auxiliary valve 32. This return may also be assured by the provision of a spring (not shown) actuating the piston in the desired direction.

Although only one embodiment of the invention is illustrated in the accompanying drawings and described in the foregoing specification, it is to be expressly understood that the invention is not so limited. Thus, the gate of the valve may have omitted therefrom the auxiliary valve mounted thereon, and the operating mechanism for the valve may be simplified accordingly. Other variations, such as in the shape or nature of the parts illustrated, may also be made without departing from the spirit and scope of the invention as will not be apparent to those skilled in the art.

What is claimed is:

1. Flow control valve apparatus comprising a casing member having a passage therethrough, a valve member movable with respect to the casing member between a closed position in which it spans said passage and an open position in which it is at least partially retracted from the passage, fluid pressure actuated sealing means interposed between said casing member and the valve member around said passage to interrupt flow through said passage, means for moving the valve member between open and closed positions, means selectively subjecting the sealing means to pressure, and control means for the last two named means so constructed and arranged that the sealing means can be subjected to pressure only when the valve member is in closed position.

2. Valve apparatus as defined in claim 1 wherein the sealing means is hollow and expansible under pressure and contractible under vacuum, and comprising means selectively to subject the sealing means to a vacuum, the control means including means for preventing opening movement of the valve member unless the sealing means is subjected to a vacuum.

3. Valve apparatus as defined in claim 2 wherein the valve member slides generally transversely of the passage, and the sealing means includes a casing confronting diaphragm mounted on the valve member, the diaphragm when inflated by internal pressure sealingly contacting the casing and when contracted by internal vacuum lying spaced from the casing.

4. Valve apparatus as defined in claim 3 wherein the means for moving the valve member between open and closed positions includes a tube connected to the member, and the interior of the tube is connected to the interior of the sealing means and serves as a conduit for selectively subjecting the sealing means to pressure or vacuum.

5. Valve apparatus as defined in claim 4 wherein the tube is a piston rod, and comprising a piston connected to the piston rod remote from the valve element, a cylinder containing the piston, and means selectively to subject the piston to fluid pressure in reverse directions to move the valve element between its open and closed positions.

6. Valve apparatus as defined in claim 5 comprising a source of fluid under pressure, a source of vacuum, and a control valve connected to such two sources and to the interior of the tube and operative in one position to subject the sealing means to pressure and in another position to subject the sealing means to vacuum.

7. Valve apparatus as defined in claim 6 comprising a contactor mounted on the cylinder and cooperating with the control elements including the control valve so that the sealing means is not subjected to pressure unless the valve member is in its closed position, and so that the sealing means may be subjected either to pressure or to vacuum when the valve member is in its closed position.

8. Valve apparatus as defined in claim 7 comprising a manometer connected to the interior of the sealing means and responsibe to both a condition of vacuum in the sealing means and a positive pressure in the sealing means, a second control valve responsive to the manometer for selectively admitting fluid under pressure into the cylinder to retract the valve member, the manometer operating the second control valve so that fluid under pressure is admitted to the cylinder to retract the valve member only when the interior of the sealing means is under vacuum.

9. Flow control valve apparatus comprising a casing member having a passage therethrough, a main valve member movable with respect to the casing member between a closed position in which it spans said passage and an open position in which it is at least partially retracted from the passage, fluid pressure actuated sealing means mounted on the main valve member and interposed between said casing member and the main valve member around said passage to interrupt flow through said passage, a pressure operated auxiliary valve member movable with respect to the main valve member for selectively opening and closing an auxiliary valve port in the main valve member, means including a cylinder, a piston therein, and a hollow piston rod connected at its rear end to the piston, and connected at its forward end to the auxiliary valve member for moving said auxiliary valve member, the piston rod being provided along a part of its body with a lost motion connection to the main valve member for moving the main valve member between open and closed positions, means selectively subjecting the sealing means and the auxiliary valve member to fluid pressure including a source of fluid pressure, means connecting the interior of the piston rod to the source of pressure, and means connecting the interior of the sealing means and the auxiliary valve member to the interior of the hollow piston rod.

10. Valve apparatus as defined in claim 9 wherein the piston connected to the piston rod is sealingly received for limited sliding movement in a second cylinder, which constitutes also a second, larger piston sealingly received in the cylinder, whereby the auxiliary valve member and the first mentioned piston may move relative to the main valve member and to the second piston to uncover the auxiliary valve port without movement of the main valve member from closed position.

11. Valve apparatus as defined in claim 10 comprising a first fluid inlet passage leading to the first space between the forward end of the cylinder, closer to the valve members, and the second cylinder which constitutes also a second, larger piston, a second fluid inlet passage leading to the second space between the forward end of the second cylinder, closer to the valve members, and the piston connected to the piston rod, and means for feeding each of said spaces with fluid under pressure from separately controlled sources, whereby the auxiliary valve member may be opened independently of the main valve member.

12. Valve apparatus as defined in claim 11 comprising a fluid checking means interposed in the fluid line which feeds the second space, and means opening the fluid checking means to subject the second space to fluid pressure only when the second piston lies at the terminus of its stroke corresponding to the closed position of the main valve member.

13. Valve apparatus as defined in claim 12 comprising means to permit the feeding of fluid under pressure to the interior of the piston rod when the main valve member has achieved the final phase of its closing movement and is in fully closed position.

14. Valve apparatus as defined in claim 9 wherein the hollow piston rod has a closed forward end and a cylindrical passage adjacent such forward end, said passage forming a cylinder directed normal to the direction of movement of the main valve member, a piston reciprocable in said normal cylinder, the auxiliary valve member being mounted on the outer end of the above mentioned piston and cooperating with the auxiliary valve port in the main valve member.

15. Valve apparatus as defined in claim 9 comprising a tube telescopically and sealingly mounted with respect to the rear end of the piston rod remote from the main valve member, the rear end of the tube being selectively connected to the source of pressure, a lost motion connection between the piston rod and the tube whereby these parts move together during the initial part of the opening of the main valve member and during the final part of the closing of the main valve member, and at other times move relative to each other, and means for selectively feeding fluid under pressure into the tube and thence through the piston rod to the interior of the sealing means and to the auxiliary valve member.

16. Valve apparatus as defined in claim 15 comprising means responsive to movement of the tube which indicates the positioning of the main valve member.

17. Valve apparatus as defined in claim 15, wherein the piston, connected to the hollow piston rod is slidable in a second, larger main piston which constitutes the first-mentioned cylinder, containing the first-mentioned piston, and the second, main piston is slidable in a second, main cylinder, and comprising a source of vacuum, a first valve that selectively connects the interior of the hollow sealing means with the vacuum source or the pressure source, second valve that selectively connects the space between the ends close to the main valve member of the main cylinder and the main piston with the pressure source or the atmosphere, a third valve that selectively connects the space between the ends remote from the main valve member of the main cylinder and the main piston with the pressure source or the atmosphere, a manometer provided with movable pressure indicating means connected with the interior of the hollow sealing means, a contactor for signalling certain positions of said hollow piston rod, a main control device with two active positions for the control of the afore-mentioned valves, and means whereby, in the position of the hollow piston rod corresponding to the closed position of the main valve member, the first mentioned valve puts in communication the pressure source with the interior of the sealing means, whereas the two other valves put in communication with the atmosphere the main cylinder on each side of the main piston, while the indicating means of the manometer occupies a position related to the internal pressure of the sealing means, and the main control device is either inactive in an intermediate position between its two active positions or has been made non-functional in its active positions by operation of the manometer.

18. Valve apparatus as defined in claim 17 wherein the components described are capable, in the active position of the main control device corresponding to the opening movement of the main valve member from its closed position, of actuating the first-mentioned valve so as to connect the interior of the hollow sealing means with the source of vacuum, and of actuating the second-mentioned valve so as to connect the main cylinder with the pressure source, the main control device remaining, however, non-functional with respect to the second-mentioned valve until the indicating means of the manometer has occupied a position that indicates that the interior of the sealing means is subjected to vacuum.

19. Valve apparatus as defined in claim 18, wherein the components described are capable, in the active position of the main control device corresponding to the closing movement of the main valve member from its open position, of actuating the third mentioned valve in order to connect with the pressure source the interior of the main cylinder on the side of the main piston remote of the main valve member, while the signalling contactor, on completion of the closing movement of the main valve member, actuates the first mentioned valve so as to connect with the pressure source the interior of the sealing means.

20. Valve apparatus as defined in claim 19 controlling the opening or the closing of a tank, comprising a fourth valve which selectively connects the space between the first mentioned and second pistons to a source of pressure or to the atmosphere, and means responsive to pressure in the tank for selectively operating the fourth valve to connect said space between both said pistons with the said pressure source and thus to open the port in the main valve member.

21. Valve apparatus as defined by claim 20 wherein the valves are electromagnetic valves.

22. Valve apparatus as defined in claim 21 wherein the manometer is a manometer with contacts, one of which contacts corresponds to a vacuum condition and another contact to a condition of pressure, and the said manometer is connected to a relay having a coil and two pairs of contacts, the manometer being so connected to the relay as to energize the coil when the manometer registers a vacuum condition and de-energizes the coil when the manometer registers a condition of pressure.

23. Valve apparatus as defined in claim 22 wherein the signalling contactor has three pairs of contacts, a first pair of which is in a first circuit of the first-mentioned valve and the circuit of a signalling lamp indicating the closed condition of the main valve member, a second pair of contacts is in a second circuit of a signalling lamp indicating the open position of the main valve member, and a third pair of contacts is in the first circuit with an interposed intermittent signaller for indicating that the main valve member is in an intermediate position.

24. Valve apparatus as defined in claim 23 wherein the first circuit of the first-mentioned valve includes a relay whose contact is normally closed by the action of a spring, and such last-named contact being opened by energizing the coil of the relay while the main control device is put in the position for opening the main valve member.

25. Valve apparatus as defined in claim 24 wherein the main control device is a switch which comprises three pairs of contacts, the first pair being part of the circuit of the coil of the relay connected with the first mentioned valve, the second and the third pair being part of, respectively, the circuits of the above second and third mentioned valves, the switch being so constructed as to permit to close simultaneously the contacts of the first and second pairs of contacts for effecting the opening of the main valve member, and as to permit, by displacement in the opposite direction, to close the contacts of the third pair of contacts in order to effect the closing of the main valve member.

26. Valve apparatus as defined in claim 15 comprising a valve operated by the tube interposed in the fluid pressure circuit feeding the sealing means, said valve being opened upon the final part of the movement of the main valve member into closed position, and closed upon the initial part of the movement of the main valve member in opened position.

27. Valve apparatus as defined in claim 26 comprising a source of fluid pressure, a source of vacuum, a two-way valve connected to said sources and in series with the valve operated by the tube, and control means for the two-way valve whereby, when the main valve member has reached its closed position, the interior of the sealing means may be subjected to pressure or vacuum.

28. Valve apparatus as defined in claim 27 comprising means responsive to the position of the tube and actuating the two way valve so as not to connect to pressure source the valve operated by the tube, when the tube is not in the position corresponding to the closed position of the main valve member.

29. Valve apparatus as defined in claim 28 comprising a contact manometer responsive to conditions of pressure or vacuum in the interior of the sealing means, a main switch for selectively initiating main valve member closing and opening operations, the contact manometer being connected in circuit with the main switch so as to prevent opening of the main valve member when the sealing means is subjected to pressure.

30. Valve apparatus as defined in claim 29 comprising means detecting the presence of a foreign body in the path of the open main valve member, and means responsive to the last-named means for disabling the main valve member closing circuit connected to the main switch.

References Cited in the file of this patent

UNITED STATES PATENTS

| | | |
|---|---|---|
| 1,957,807 | Robinson | May 8, 1934 |
| 2,582,877 | Mekler | Jan. 15, 1952 |

FOREIGN PATENTS

| | | |
|---|---|---|
| 70,376 | Germany | of 1893 |
| 692,809 | France | of 1930 |